United States Patent [19]
Carpentier et al.
[11] 3,744,023
[45] July 3, 1973

[54] DETECTION AND CORRECTION OF PHASE ENCODED DATA

[75] Inventors: Anthony L. Carpentier; Juan A. Rodriguez, both of Boulder, Colo.
[73] Assignee: Storage Technology Corporation, Boulder, Colo.

[22] Filed: May 17, 1971
[21] Appl. No.: 144,076
[52] U.S. Cl. .................... 340/146.1 F, 340/174.1 F
[51] Int. Cl. .......................................... G11b 27/36
[58] Field of Search ............... 340/174.1 B, 146.1 F

[56] References Cited
UNITED STATES PATENTS
3,262,097 7/1966 Miller .......................... 340/146.1 F

*Primary Examiner*—Malcolm A. Morrison
*Attorney*—Woodcock, Washburn, Kurtz & Mackiewicz

[57] ABSTRACT
Phase encoded data on multi-track magnetic tape is decoded by integration detection. A first phase distortion check is made after the integration detection of the data on each track to detect a failure of the integration to reach a threshold level above or below the integrator squelch level. A second phase distortion check is made of the data on each track to determine if a data transition occurred within a certain portion of each bit cell. Each byte of data on the tape including one bit from each track is then stored in an error correction register. Simultaneously, a dead track register stores any phase check bit generated by the first and second phase distortion checks. If a parity check of the byte in the error correction register indicates a lack of parity, the byte is corrected in the bit position indicated by the phase check bit in the dead track register.

11 Claims, 4 Drawing Figures

DETECTION AND CORRECTION OF PHASE ENCODED DATA

BACKGROUND OF THE INVENTION

1. Field of the Invention

This invention relates to the detection of phase distortion during the reading of phase encoded data. This invention also relates to the correction of such distortion.

Phase encoding is utilized on multi-track magnetic tape in computer tape drives where high data bit densities and a high degree of reading accuracy are required. On such phase encoded magnetic tape, a flux change in each track of the tape is produced for both a 1 and a 0 where the flux change for a 1 and a 0 are in reverse directions. Since a flux change or a data transition on the recording medium must occur for each bit written, synchronization of reading can be made self-locking using the data being read as a synchronizing signal.

On a read operation of the tape, the phase of the incoming data is compared with a variable frequency oscillator having a nominal frequency matching the nominal frequency of the input data. A phase comparison binary signal is then generated with one level representing the in-phase condition and the other level representing the out-of-phase condition. The binary signal is then integrated over each bit period of each bit cell with the polarity of the integrated result indicating the value of the bits.

Unfortunately, the phase encoded data can become phase distorted prior to or during reading. One form of distortion which can lead to reading errors involves a phase shift where the flux change or data transition does not occur in the middle of a bit cell. Another form of phase distortion is produced by noise. Since any noise will reduce the level of the integrated output signal, noise can also create errors in reading the phase encoded data. Nevertheless, certain distortions are not sufficiently extreme to impair the accuracy in reading the phase encoded data. Furthermore, where the distortion does impair the accuracy in reading, the distortion may be correctable.

THE PRIOR ART

Heretofore, much of the distortion in phase encoded magnetic tape has gone undetected during reading. Although the amplitude of the channel information in a track has been checked to determine the reliability of each track of the tape, the amplitude itself is a poor indicator of reliability since the encoded data is a function of phase rather than amplitude. It is possible that a track in a tape may be considered unusable after the amplitude check when in fact the phase encoding is not at all distorted and the track is indeed usable.

It has been the practice in the prior art to "dead track" a particular track which has failed the amplitude check. Of course, the tape may still be utilized by relying upon parity to read the data as long as only one track fails the amplitude check. But if the second track fails the amplitude check, the entire tape must be discarded.

SUMMARY OF THE INVENTION

It is one object of the invention to detect phase distortion for phase encoded data during reading.

In accordance with this object, an apparatus is provided comprising a variable frequency means for generating a clock signal having a nominal frequency substantially equal to the frequency of a phase encoded data input signal and a decoding means for comparing the phase of the clock signal with the input signal and generating a phase comparison signal having a state within each bit cell representing relative phases of the clock signal and the input signal. A phase distortion detecting means which generates a phase error signal detects phase distortion occurring before or after the change of state of the clock signal within each bit cell.

The phase distortion detecting means may comprise means for detecting the absence of a data transition in a phase encoded input signal during a certain period in each bit cell. The phase distortion detecting means may also comprise means for indicating failure of the phase comparison signal to reach a predetermined signal level after integration by the decoding means.

It is another object of this invention to correct for phase distortion of phase encoded data.

In accordance with this object, a plurality of phase encoded input data signals comprising a series of data bytes, with each byte represented by one bit cell from each of the input signals, are decoded and phase distortion in any bit cell of the byte is detected. A parity check is then performed on the byte. If a phase error check bit has been generated by the phase distortion detecting means for a particular bit cell, the appropriate bit cell of data will be corrected if the byte fails the parity check. If the byte passes the parity check, the byte is assumed correct and no correction is made.

DETAILED DESCRIPTION OF A PREFERRED EMBODIMENT

Figure 1:
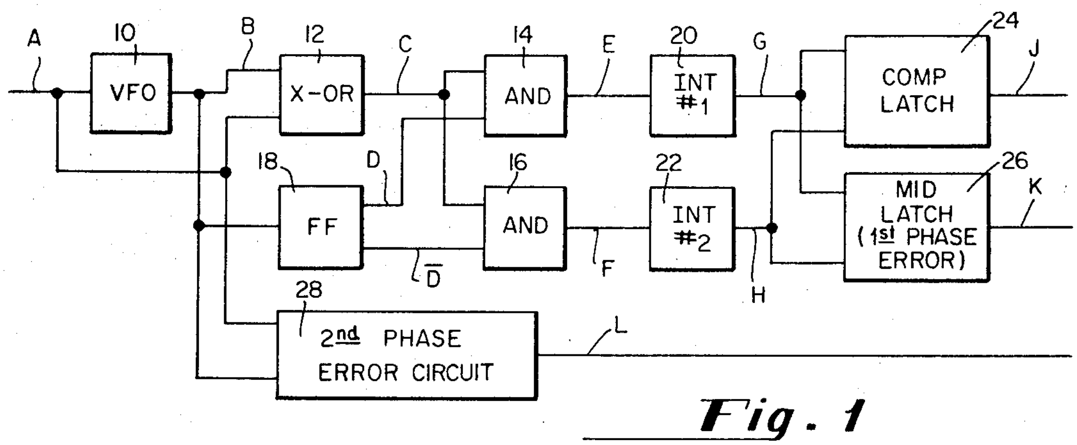
FIG. 1 is a block diagram of a system for detecting phase distortion during reading of a phase encoded data input signal.
Figure 2:
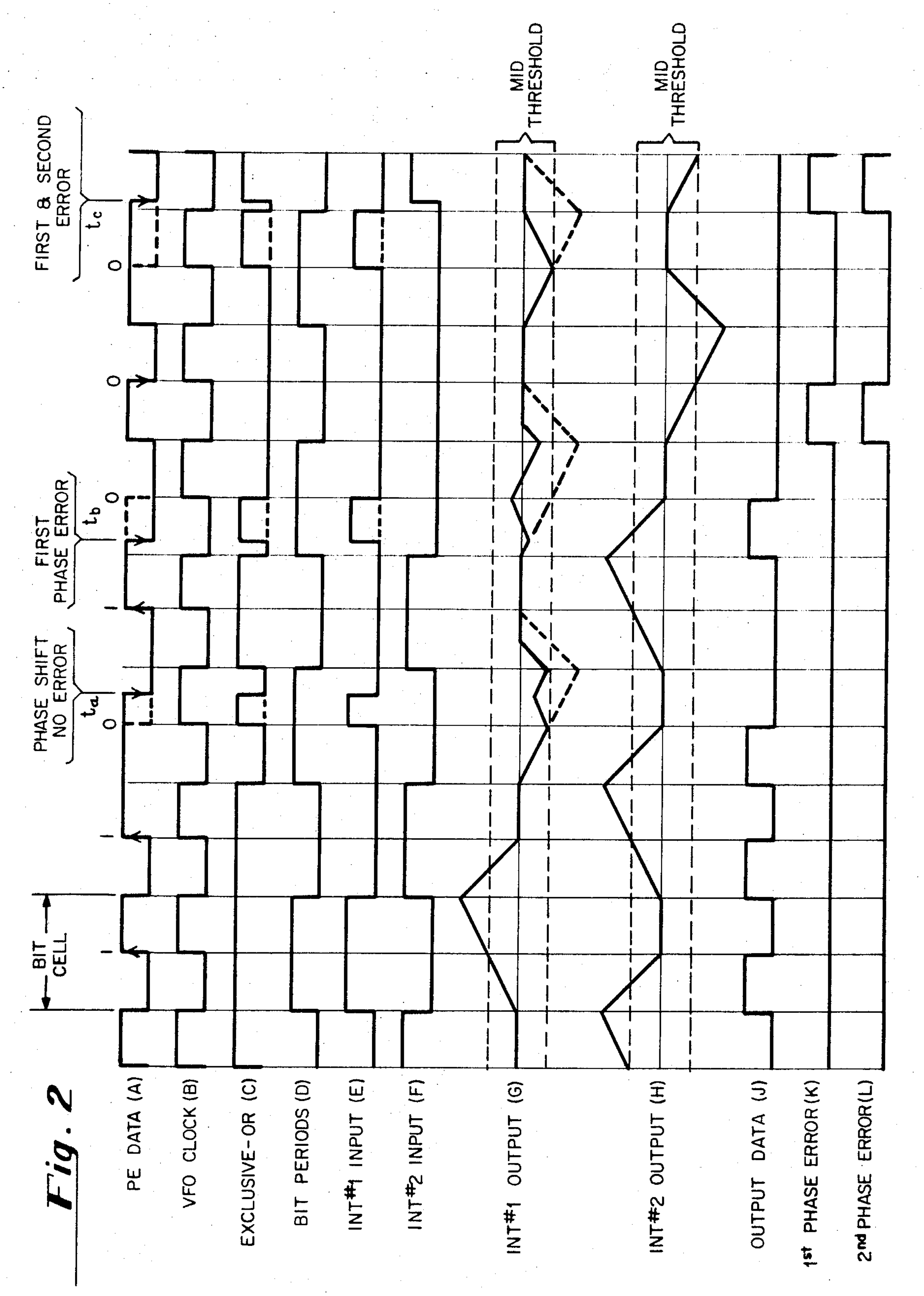
FIG. 2 is a waveform diagram representing various signals of the block diagram of FIG. 1.

A decoding and phase distortion detection system for phase encoded data from multi-track magnetic tape of the type utilized in computer tape drives will now be described with reference to FIGS. 1 and 2. (It will of course be appreciated that such a system will be provided for each track of the tape.) A phase encoded data signal A, after preamplification, differentiation, and limiting, is applied to the input of the variable frequency oscillator 10 having a nominal frequency matching the nominal frequency of the phase encoded data input signal. As shown in FIG. 2, a bit period for a bit cell of the phase encoded data signal A corresponds with the period for the clock signal B generated by the variable oscillator 10. As also shown in FIG. 2, a flux change or data transition in the signal A corresponds with the change of state of the clock signal B at the center of the bit cell in the absence of any phase distortion. The variable frequency oscillator 10 is slaved to the input data signal by utilizing the phase difference therebetween to produce error signals which are used to change the frequency of the variable oscillator in a direction to minimize the difference. Such an arrangement is utilized in the IBM 2803 tape control unit.

In order to decode the phase encoded data of the input signal A, the clock signal B and the input signal A are applied to an exclusive-OR gate 12. When the phase of the input data signal A and the clock signal B are the same, the corresponding bit cell of the binary signal C generated at the output of the exclusive-OR gate 12 is 1. When the phase of the input data signal A and the clock signal B are opposite, the binary signal C is 0 for that particular bit cell.

In accordance with the invention of copending application Ser. No. 144,085, filed May 17, 1971 and assigned to the assignee of this invention, the binary signal C is now divided into two binary signals, one binary signal E representing a first set of bit cells and a second binary signal F representing a second set of alternate bit cells. This division is accomplished by a first AND gate 14 and a second AND gate 16 having inputs connected to the output of the exclusive-OR gate 12. By providing a flip-flop 18 which is set and reset by the clock signal B from the variable oscillator 10, the AND gates 14 and 16 may be alternately enabled by bit period timing signals D and $\overline{D}$ from the first and second outputs respectively of the flip-flop 18.

The divided signals E and F are now ready for application to a first integrating means 20 and a second integrating means 22. The integrating means 20 and the integrating means 22 which perform both positive and negative integration on the signals E and F during the first set of bit cells and the second set of bit cells respectively with intermediate squelching, provide integrated output signals G and H respectively. The integrated output signals G and H may then be applied to a comparator latch 24 to generate a decoded data signal J which represents the data of the bit cells in the phase encoded input signal A.

However, as indicated in FIG. 2, the input data signal A does suffer from some phase distortion. At time $t_a$, the data transition of the input data signal A is late resulting in an additional change in state of the exclusive-OR or phase comparison signal C. This change in state is also reflected in the input signal E to the first integrating means 20. Further phase distortion occurs at times $t_b$ and $t_c$ where the data transitions occur prematurely and late respectively. The particular phase distortions at times $t_a$, $t_b$ and $t_c$ represent phase shift in the input data signal A. Another type of phase distortion not shown in FIG. 2 yet troublesome is that of noise. In order to detect the illustrated phase distortion as well as noise in the data input signal A, a first phase error detection means comprising an MID (marginal integration detection) latch 26 and a second phase error circuit 28 are provided as shown in FIG. 1.

Since phase distortion in the form of noise and phase shift will reduce the amplitude of the integrated output signals G and H, detecting the integrated levels of the output signals G and H will provide an indication of phase distortion. This aspect of phase distortion detection is provided by the MID latch 26. As shown in FIG. 2, the phase shift errors at times $t_a$, $t_b$, and $t_c$ have attenuated the amplitude of the integrated output signal G. By providing a MID threshold for both positive and negative integration so as to form a zone about the squelch level by triggering the MID latch 26 at the end of each bit cell of integration, only the more serious phase distortion which might lead to an error in reading will be detected.

In this connection, it will be noted that the phase distortion occurring at time $t_a$ does not produce a phase check error bit in a first phase error signal K since the level of the integrated output signal G has reached the negative threshold level at the end of the bit cell. In contrast, the integrated output signal G at both times $t_b$ and $t_c$ is not exceeding the negative threshold level at the end of the respective bit cells. Although the threshold level has been exceeded at the center of the bit cell at time $t_c$, the threshold is not exceeded at the end of the bit cell when triggering of the MID latch 26 occurs. Accordingly, phase error check bits are generated in the phase error signal K for the bit cells being read at times $t_b$ and $t_c$. Thus by providing a zone about the squelch level for the first and second integrating means 20 and 22, only the more serious error creating phase distortion will be detected and such distortion for purposes of this specification will be described as a phase error. It will of course be appreciated that the MID threshold operates in a similar manner for positive integration of the output signal G where the phase distortion occurs in a bit cell where positive integration is required. The MID latch 26 also functions in the same manner with respect to the integrated output signal H where the phase distortion occurs in those bit cells during which the second integrating means 22 is integrating.

The second phase error circuit 28 is provided to detect a data transition in the data input signal A which does not correspond with the change in state of the clock signal B and thus does not occur at the center of each bit cell. In effect, the second phase error circuit 28 detects a phase distortion characterized by the failure of the input data signal A to change state within a window of the bit cell located between the time the clock signal B changes state and the end of the bit cell.

Figure 3:
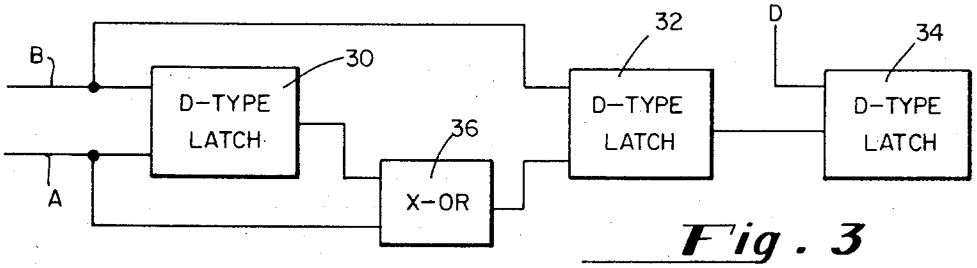
FIG. 3 is a schematic diagram of the second phase error circuit shown in block diagram form in FIG. 1.

As shown in FIG. 3, the second phase error circuit comprises a latch means which is triggered by the clock signal B and the bit period timing signal D and comprises D-type edge-triggered latches 30, 32 and 34 in combination with an exclusive-OR gate 36. The D-type latch 30 is initially triggered at the beginning of the bit cell by the change in state of the clock signal B. If a data transition occurs in the input signal A before the clock signal B changes state, the output of the exclusive-OR gate 36 will be 0 and the output of the D-type latches 32 and 34 at the time the signals B and D change state will also be 0. On the other hand, the absence of a data transition in this period, will result in a 1 at the output of the exclusive-OR gate 36 and thus a 1 at the output of the latch 32 when the clock signal D does change state. Simultaneously, the latch 34 is triggered by the bit period timing signal D to produce a phase error check bit.

Referring now to the second phase error signal L in FIG. 2, it will be seen that the phase distortion in the form of a phase shift at time $t_a$ does not result in a phase check error bit in the signal L since the data transition does occur in the second half of the bit cell. On the other hand, the phase distortion at times $t_b$ and $t_c$ does produce phase error check bits in the signal L since there is an absence of a data transition in the window in the second half of the bit cell in each case.

It will of course be appreciated that the position of the window may be varied by changing the triggering in the second phase circuit 28. For example, by utilizing a trigger for latches 30 and 32 having a frequency double that of the clock signal B and triggering the latch 34 with a signal having a frequency double that of the bit period timing signal D, a window of the same size located in the center of the bit cell will be obtained utilizing the exact same circuit shown in FIG. 3. It will also be understood that the first phase error signal K and the second phase error signal L will not necessarily be identical. For example, if the data transition at time $t_b$ were located in the second half of the bit cell and displaced the same length of time from the center of the bit cell, no phase error check bit would be generated at the end of the bit cell in the second phase error signal L.

Figure 4:
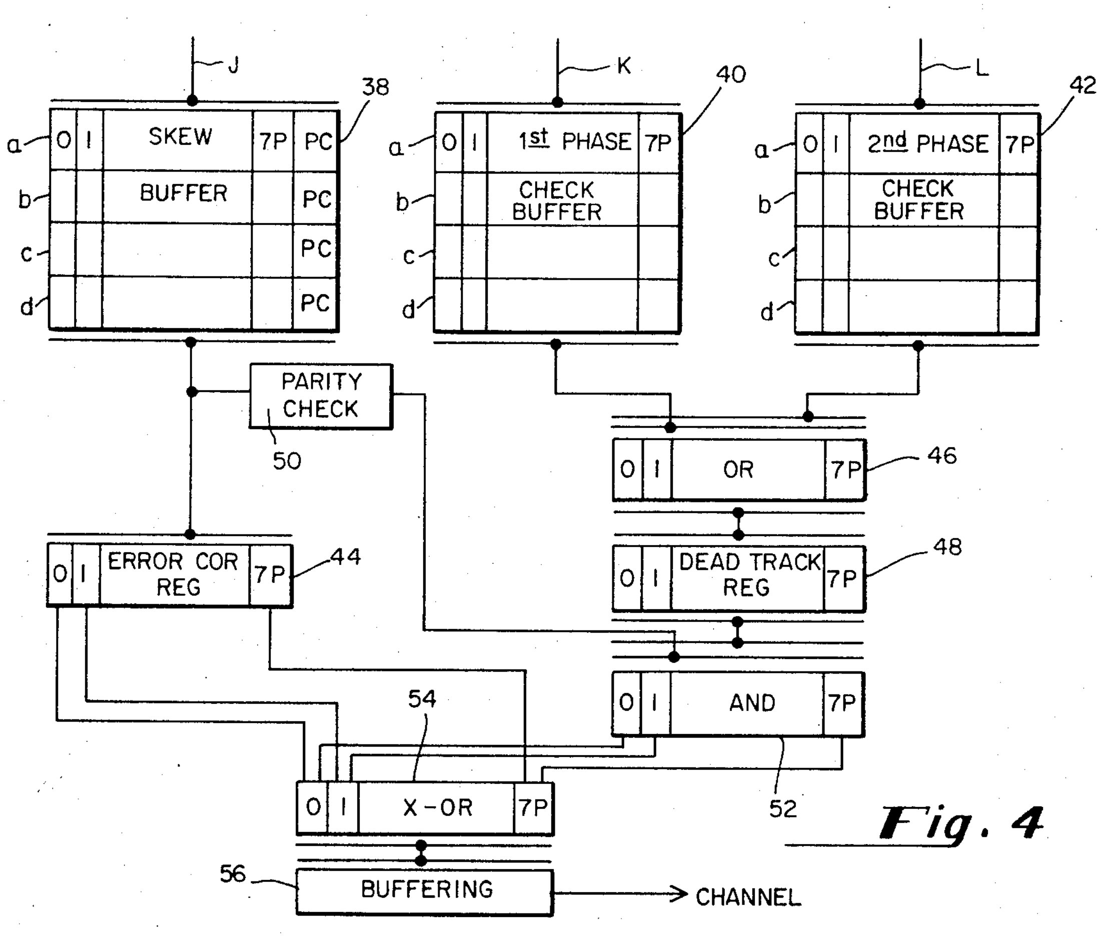
FIG. 4 is a schematic diagram of a circuit for correcting the detected phase distortion.

In accordance with another aspect of this invention, the phase distorted data is corrected. As shown in FIG. 4, a skew buffer 38 receives bytes of data from a plurality of comparator latches 24, one such comparator latch for each data track or bit in a byte of data. Thus the buffer 38 has eight data bit positions plus a parity check bit position for each byte of data. In all, four bytes of data may be accumulating in the skew buffer 38 at a time.

Simultaneously, a first phase check buffer having eight phase error check bit positions for four bytes of data is accumulating the phase error check bits from eight MID latches 26. Similarly, a second phase check bit having the same number of bit positions and accommodating the same number of data bytes is accumulating phase check error bits from eight second phase check error circuits 28. When one byte of the skew buffer 38 is filled with data from the comparator latches 24, the data is read out in parallel to an error correction register 44 having eight bit positions. Simultaneously, the phase check error bits from the first phase check buffer 40 and the second phase check buffer 42 are OR'ed or eight OR gates 46 and then applied to a dead track register 48.

If parity of the transferred byte is not satisfied as determined by the parity check means 50, the AND gates 52 are enabled by the parity check means 50 and the phase error check bit in the dead track register 48 is applied to exclusive-OR gates 54 along with the byte of data in the error correction register 44. The exclusive-OR operation performed by the exclusive-OR gate 54 corrects the byte of data which is then transferred to a buffering means 56 for output to a channel of a central processing unit. In the event that parity is satisfied, the AND gate means 52 is not enabled and the error correction register and exclusive-OR gate 54 pass the byte of data to the buffer 56 without corrections being made.

Consider the following situation. The byte of data being transferred from the skew buffer 38 comprises the following bits:

100000001.

Since the last bit is a parity check bit, the byte of data in the error correction register may be represented as:

10000000.

Assume that the dead track register has the following phase error check bit:

01000000.

Since an odd parity check by the parity check means 50 reveals a lack of parity in the byte of data being transferred from the skew buffer 38, the AND gates 52 will be enabled to produce the following corrected byte of data:

11000001.

In the foregoing correction system, the check bits from the first phase check buffer 40 and the second phase check buffer 42 have been OR'ed. In certain instances, it may be desirable to utilize only the output from the first phase check buffer or only the output from the second phase check buffer depending upon the requirements of the system. It may also be desirable to utilize the output of one of the buffers only at certain times. Such modifications may be easily implemented by those of ordinary skill in the art. It should also be understood that when the dead track register has more than one bit position filled for any byte of data, the byte is uncorrectable. This does not however mean that the entire tape is unusable since subsequent bytes may be correct or correctable. It is important to note that errors may occur in different tracks or different bit positions and still be correctable as long as no more than one error occurs in any byte. Thus, unlike the prior art systems, this system does permit a tape to be salvaged even though errors occur in different tracks.

Although a particular embodiment of the invention has been shown and described, various modifications within the scope of the invention as set forth in the appended claims may occur to those of ordinary skill in the art.

What is claimed:

1. In a multi-track computer tape drive, apparatus for indicating phase distortion during the reading of a phase encoded data input signal including a series of bit cells, said apparatus comprising:

a variable frequency means for generating a clock signal having a frequency substantially equal to the nominal frequency of said input signal and having a change of state corresponding with the nominal data transition of said input signal a decoding means for comparing the phase of said clock signal with said input signal and generating a phase comparison signal having a state representing relative phases of said clock signal and said input signal for each bit cell; and a means responsive to the phase relationship between said clock signal and said input signal for detecting a phase distortion in said input signal, said phase distortion detecting means generating a phase error signal indicating the presence of phase distortion.

2. The apparatus of claim 1 wherein said phase distortion detecting means detects noise on said input signal and generates a phase error signal indicating the presence of said noise.

3. The apparatus of claim 1 wherein said phase distortion detecting means detects a phase shift in the form of a data transition occurring outside a window in the bit cell.

4. The apparatus of claim 1 wherein said phase distortion detecting means comprises a latch means having said input signal as an input, said latch means being triggered at the beginning and end of said window to generate a phase error bit in said phase error signal at the end of a bit cell wherein phase distortion occurs.

5. The apparatus of claim 1 further comprising: an integrating means for integrating said phase comparison signal during each bit cell, said phase distortion detecting means including means for detecting the failure of the integrated output from said integrating means to exceed a threshold level thereby indicating phase distortion.

6. The apparatus of claim 5 wherein said means for detecting the failure of said integrated output to reach a predetermined level comprises a latch means triggered at the end of a bit cell to produce phase error bit in said phase error signal only when said integrated output has failed to reach said threshold level.

7. A multi-track computer tape drive system for correcting errors resulting from phase distortion of bit cells of phase encoded data on a multi-track magnetic tape during reading, each byte of data on the tape having bits represented by a flux change in a bit cell on each track of the tape, said apparatus comprising:

a decoding means for detecting each bit in each byte of data;

a detecting means for determining phase distortion in a bit cell for each byte of data and generating a phase error check bit for said bit cell;

a means for performing a parity check on each byte of data; and a means for correcting an erroneous bit in a byte of data in response to the phase distortion detected in the corresponding bit cell when said error detecting means indicates a lack of parity.

8. The apparatus of claim 7 further comprising:

a skew buffer connected to said decoding means for accumulating decoded bytes of data;

an error correction register connected to the output of said skew buffer for receiving bytes of data from said skew buffer;

a phase check buffer means for accumulating phase error check bits for a plurality of bytes; and a dead track register for receiving said phase error check bit for each byte of data from said phase check buffer.

9. The apparatus of claim 8 wherein said detecting means detects the absence of a data transition in a window of the bit cell and generates a first phase error check bit therefore.

10. The apparatus of claim 9 wherein said decoding means includes an integration means and said detecting means comprises means for detecting the failure of the output from said integration means to reach a predetermined signal level by the end of a bit cell and generates a second phase error check bit therefore.

11. The apparatus of claim 10 wherein said phase buffer means comprises a first buffer accumulating said first phase error check bit for each byte and a second buffer for accumulating said second phase error check bit for each byte.

* * * * *